G. MEES.
METHOD OF REGULATING AND CONTROLLING THE VALVE MOTION IN EXPLOSIVE MOTORS.
APPLICATION FILED JAN. 18, 1906.
1,064,514.
Patented June 10, 1913.
2 SHEETS—SHEET 1.
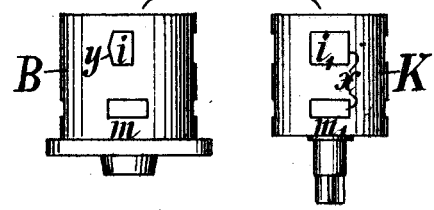
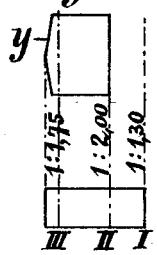
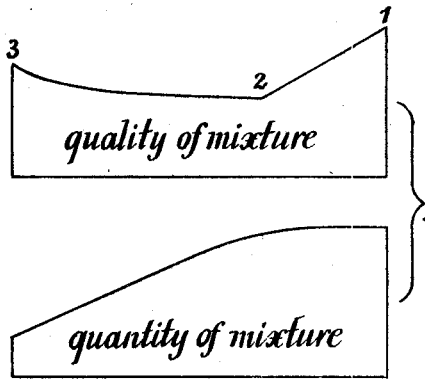
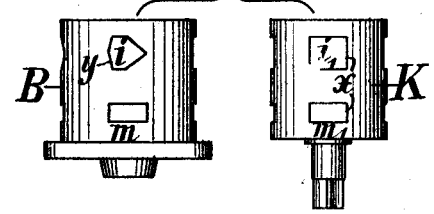
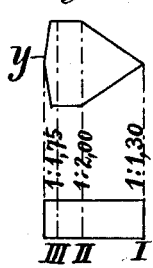
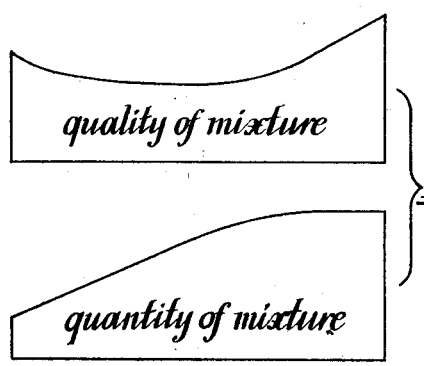

G. MEES.
METHOD OF REGULATING AND CONTROLLING THE VALVE MOTION IN EXPLOSIVE MOTORS.
APPLICATION FILED JAN. 18, 1906.
1,064,514.
Patented June 10, 1913.
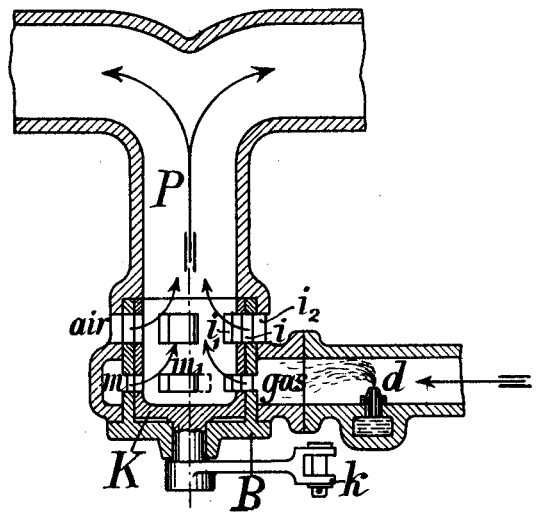
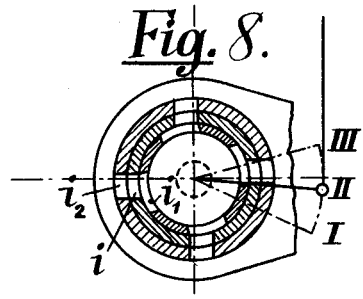
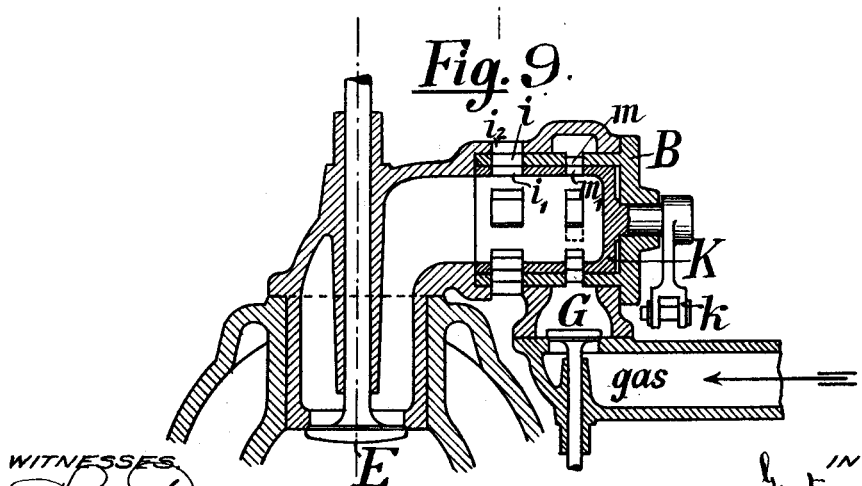

UNITED STATES PATENT OFFICE.

GUSTAV MEES, OF BARMEN, GERMANY, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

METHOD OF REGULATING AND CONTROLLING THE VALVE-MOTION IN EXPLOSIVE-MOTORS.

1,064,514. Specification of Letters Patent. Patented June 10, 1913.

Original application filed April 16, 1904, Serial No. 203,450. Divided and this application filed January 18, 1906. Serial No. 296,668.

*To all whom it may concern:*

Be it known that I, GUSTAV MEES, a citizen of the German Empire, residing at Barmen, in the Province of Rhenish Prussia and Kingdom of Prussia, Germany, have invented certain new and useful Improvements in the Method of Regulating and Controlling the Valve-Motion in Explosive-Motors, of which the following is a specification.

This application is a division of application Serial Number 203,450, and relates to the method of regulating, in accordance with the load, the force developed by internal combustion engines. This method, in general terms, involves varying the charge when the load varies, and more specifically involves automatically varying the richness or quality of the charge under varying heavy loads without greatly varying the volume and thereby varying the compression, and further involves automatically varying the quantity or volume of the explosive mixture with varying lighter loads without varying the quality to a corresponding degree, the compression, however, necessarily varying with the quantity of the mixture.

It is well known that with great reduction of compression the results are less satisfactory, and with this fact in view my method provides for increasing the quality or richness of the explosive mixture when the volume decreases in nearing the condition of no load. It results that at all loads, from zero to a maximum, perfect ignition and strong explosion are secured with great economy, especially with moderate and light loads. This method can be carried out practically by apparatus of the general character of that disclosed in the application of which this application is a division.

In the accompanying drawings, Figure 1 shows in side elevation a valve box and a cup-like valve adapted to fit the interior of the box, both members being provided with certain ports suitable for carrying out my method. Fig. 2 is a diagram illustrating the action of the parts shown in Fig. 1. Fig. 3 is a diagram illustrative of the variation of the charge in quantity and richness, or quality, when the devices of Fig. 1 are used. Fig. 4 is a figure similar to Fig. 1, showing a slightly different construction for carrying out the same general method. Fig. 5 is a diagram similar to Fig. 2 and explanatory of the action of the devices of Fig. 4. Fig. 6 is a diagram, corresponding to Fig. 3, for showing to the eye the variation in the charge when the apparatus of Fig. 4 is in use. Fig. 7 shows in diametrical section the assembled valve, valve box, and adjacent parts of an engine for using liquid fuel. Fig. 8 is a transverse section of the devices of Fig. 7, the plane of section passing through the air ports, several positions of a certain regulator connection being suggested in dotted lines. Fig. 9 is a section similar to Fig. 7 showing apparatus for applying the method when gaseous fuel, instead of liquid fuel, is used.

In these figures, B represents a valve box provided with air ports $i$ and gas ports $m$ and supported in any suitable way,—as shown in Fig. 9,—in a casing supported by the engine cylinder. Within this box is placed a cup-like oscillating valve K provided with air ports $i_1$ and gas ports $m_1$ in the planes, respectively, of the air and gas ports of the valve box B. The valve is provided with a stem projecting through the bottom of the valve box and bearing an arm $k$ connected with, and swung back and forth by, a regulating device, not shown.

As indicated in Fig. 1, the gas ports $m$, $m_1$ are of equal length and width and in position to register when the valve is properly turned. The air port $i$, however, is materially less in circumferential width than the valve port $i_1$, and these two ports are so located that when the gas ports are in registry the side $y$ of the port $i$ alines with the corresponding side of the valve port $i_1$. It follows from this arrangement that when the two gas ports register air and fuel are admitted in the full volume permitted by the ports $i$, $m$, and that if the valve be rotated in the proper direction, the fuel passage will be lessened in direct proportion to the extent of rotation, while owing to the greater circumferential extent of the port $i_1$, the air will not at first be varied, and consequently the fuel element of the charge will be gradually decreased in proportion to the extent of the valve movement, or to the change in load which controls such movement. Meantime, since the air port is materially greater than the effective fuel port, the change in the volume of the charge will be relatively small and consequently the compression will remain approximately constant. If the valve be moved still farther in the same direction, the effective fuel passage will be further decreased at the same rate as before, and at the same time the air passage will be decreased at the same circumferential rate but owing to its far greater width the volume of air delivered will decrease at a relatively high rate. Thus the volume of the charge will be rapidly reduced and of course the compression will vary with the volume. We then have a certain increase in richness, or quality, of the charge, with decreasing volume and compression.

If it be assumed that the initial point of the changes above indicated is the point at which there is a maximum admission of both air and fuel, with a maximum load, the decrease of load rapidly lowers the richness or quality of the charge, as indicated at 1, 2, in the upper part of Fig. 3, with no great change in volume, as shown in the lower part of the same figure. On further decrease of load, the quality rises slightly while the volume decreases rapidly as is also indicated in the same figure. The same result is also indicated in Fig. 2 where the relative areas of the gas and air ports are assumed to be as 1 to 1.30. Before the air port is affected, the gas is gradually throttled, by closing that part of the port between I and II, so as to give the ratio 1 to 2. This latter ratio falls to 1 to 1.75 at the time when the part of the gas port between I and III has been closed. The margin $y$ of the air port is not like the corresponding margin of the port $m$ a straight line perpendicular to the adjacent margins, but is so arranged that the volume of air is decreased here more rapidly, by a virtual narrowing of the port, while the volume of gas is decreased at the former rate, the result being that the richness of the mixture rises somewhat rapidly, as indicated at 3, Fig. 3, when the charge admitted becomes very small, and thereby the loss due to slight compression is compensated.

Obviously, somewhat modified results may be obtained by changing the form and relative proportions of the admission ports, and Figs. 4, 5, 6, which are analogous to Figs. 1, 2, 3, show an air inlet such that the air is gradually decreased from the point where the gas throttling begins. In this case, the fall in richness and the change in volume and quantity are not quite the same as before, as is indicated in Fig. 6.

Fig. 7 corresponds to Figs. 1, 2, 3, but here the supporting structure is shown, with a liquid fuel device at $d$ and a discharge pipe P, the casing for the valve box having ports $i_2$ registering with the air ports $i$.

In Fig. 8 the positions of the arm $k$ at I, II, III, correspond to the stages of admission indicated by the same numerals in Figs. 2 and 5, and in this figure the valve is shown in the position where the throttling of the air begins if the valve arm be moved toward III. Fig. 9 shows a similar arrangement of the valve when gaseous fuel is used, E being the admission valve of the engine cylinder and G a gas valve opened by suction through the valve K.

It is evident that the valve K in any apparatus for carrying out my method may be replaced by a reciprocating slide or any other suitable means moved or influenced by the regulator.

What I claim is:

The method of regulating the admission of explosive mixture to an internal combustion engine subjected to varying loads, which consists in supplying to said engine an increasingly greater quantity of mixture of slightly diminishing quality or richness from minimum load to a predetermined normal load, and then in supplying from said normal load to maximum load a substantially constant quantity of mixture of increasing richness.

In testimony whereof I have affixed my signature in presence of two witnesses.

GUSTAV MEES.

Witnesses:
OTTO KÖNIG,
ARTHUR MATTHÄUS.